United States Patent
Seki et al.

(10) Patent No.: US 7,070,711 B2
(45) Date of Patent: Jul. 4, 2006

(54) POLYMERIZABLE LIQUID CRYSTALLINE COMPOSITION AND LIQUID CRYSTAL FILM PRODUCED FROM THE SAME

(75) Inventors: Takashi Seki, Yokohama (JP); Takuya Matsumoto, Yokohama (JP); Toru Nakamura, Yokohama (JP); Hitoshi Mazaki, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 63 days.

(21) Appl. No.: 10/965,180

(22) Filed: Oct. 14, 2004

(65) Prior Publication Data

US 2005/0082513 A1   Apr. 21, 2005

(30) Foreign Application Priority Data

Oct. 15, 2003   (JP)   ............................. 2003-355498

(51) Int. Cl.
- C09K 19/38 (2006.01)
- C09K 19/34 (2006.01)
- C09K 19/20 (2006.01)
- C09K 19/12 (2006.01)
- C09K 19/52 (2006.01)

(52) U.S. Cl. ........................... 252/299.61; 252/299.65; 252/299.66; 252/299.67; 252/299.01; 252/299.64; 428/1.1; 428/1.3

(58) Field of Classification Search ................ 428/1.1, 428/1.3; 252/299.01, 299.61, 299.64, 299.65, 252/299.66, 299.67, 299.7

See application file for complete search history.

(56) References Cited

U.S. PATENT DOCUMENTS

| | | | |
|---|---|---|---|
| 6,660,344 B1* | 12/2003 | Lub | 428/1.1 |
| 6,666,989 B1* | 12/2003 | Toyne et al. | 252/299.01 |
| 6,894,141 B1* | 5/2005 | Satoh et al. | 528/196 |
| 2004/0173773 A1* | 9/2004 | Matsumoto et al. | 252/299.61 |
| 2004/0209006 A1* | 10/2004 | Matsumoto et al. | 428/1.1 |
| 2005/0007541 A1* | 1/2005 | Sasada et al. | 349/183 |
| 2005/0031801 A1* | 2/2005 | Shundo et al. | 428/1.1 |
| 2005/0082513 A1* | 4/2005 | Seki et al. | 252/299.01 |
| 2005/0101752 A1* | 5/2005 | Matsumoto et al. | 526/319 |
| 2005/0213009 A1* | 9/2005 | Yanai et al. | 349/137 |
| 2005/0224757 A1* | 10/2005 | Syundo et al. | 252/299.61 |

FOREIGN PATENT DOCUMENTS

| | | |
|---|---|---|
| EP | 1422255 | 5/2004 |
| EP | 1428823 | 6/2004 |
| JP | 09 003454 | 1/1997 |
| JP | 11 080081 | 3/1999 |
| JP | 11 158258 | 6/1999 |
| WO | 02 028985 | 4/2002 |
| WO | 02 100918 | 12/2002 |
| WO | 03 029235 | 4/2003 |

OTHER PUBLICATIONS

Yun et al., "Synthesis and Characterization of New Chiral Side Chain Liquid Cyrtsalline Polyoxetanes", Marcomoleculaes 2000, vol. 33, pp. 6653-6663.*

Hsu et al., "Studies on the Synthesis and Properties of Ferroelectric Side Chain Liquid Crystalline Polyoxetanes", Jour. of Polymer Science, Part A: Polymer Chemistry 1997, vol. 35(14), pp. 2843-2855.*

Fan G et al: "Synthesis and Liquid Crystalline Behaviour of Photoreactive Side-Chain Liquid-Crystalline Polyoxetanes Containing Cinnamoyl Biphenyl Mesogen" Polymer Preprints, vol. 43, No. 1, 2002, pp. 668-669, XP009035016 ISSN: 0032-3934.

* cited by examiner

Primary Examiner—Shean C Wu
(74) Attorney, Agent, or Firm—Adams & Wilks

(57) ABSTRACT

Liquid crystalline compositions contain no functional group the synthesis of which is difficult, such as (meth)acrylate and epoxy group and comprise (A) an oxetane compound having an optically active portion, (B) a side chain liquid crystalline polymeric substance having an oxetanyl group, and (C) a photo cation generator and/or a thermal cation generator. The use of the composition can provide a cholesteric-aligned liquid crystal film with excellent alignment retention properties after being fixed in the liquid crystal state and mechanical strength, without employing any complicated step such as photo irradiation under an inert gas atmosphere.

6 Claims, No Drawings

POLYMERIZABLE LIQUID CRYSTALLINE COMPOSITION AND LIQUID CRYSTAL FILM PRODUCED FROM THE SAME

FIELD OF THE INVENTION

The present invention relates to polymerizable liquid crystalline compositions and liquid crystal films produced from the same.

BACKGROUND OF THE INVENTION

In recent years, active studies and developments have been carried out so as to utilize liquid crystalline compounds as optical materials, and many of them have been already put into practical use. In order to use a liquid crystalline compound as an optical material, it is essential that after the molecules of the compound are aligned and fixed in a liquid crystal state, the aligned state can be retained under practical use conditions. As methods for making a liquid crystalline compound retained in an aligned state, there have been proposed various methods using polymerizable liquid crystalline compounds, polymeric liquid crystalline compounds, and polymeric liquid crystalline compounds having crosslinkable reactive groups.

Japanese Patent Laid-Open Publication No. 11-080081 discloses a method using polymerizable liquid crystalline compounds, such as those having a mesogen portion comprising two or more benzene rings or similar rings, spacer portions each comprising a hydrocarbon chain, and radically polymerizable reactive groups such as (meth)acrylate groups at one or both of the terminal ends. In this method, a polymerizable liquid crystalline compound is coated in a heat-melted state or in the form of a solution on an alignment substrate and dried if necessary so as to be formed into a liquid crystalline layer. Thereafter, the liquid crystalline layer thus formed is aligned in a liquid crystal state by heating and then polymerized by photo-irradiation so as to fix the layer in the liquid crystal state. However, it is necessary for this method to suppress an undesired polymerization inhibition effect caused by oxygen in the air and conduct some complicated operations such as a photo-irradiation under an inert gas atmosphere, requiring improvements in facilities and apparatus. Since a (meth) acrylate group is apt to polymerize with light or heat, a careful attention must be paid during the synthesis.

Japanese Patent Laid-Open Publication No. 11-158258 proposes a method using liquid crystalline polyesters excellent in an ability to retain an aligned liquid crystal state. However, due to the wide-spread of mobile communication tools, optical films formed from the liquid crystalline polyesters are demanded to have such a retaining ability under more sever conditions and to be more excellent in mechanical strength.

As methods using polymeric liquid crystalline compounds having crosslinkable reactive groups, Japanese Patent Laid-Open Publication No. 09-003454 proposes a method wherein polymerizable reactive groups are introduced into the main chain of a polymer and a method wherein monomer units having polymerizable reactive groups are introduced into the side chain(s). However, since the liquid crystallinity of the compounds is lowered in either of the methods, there is a limit to introduce polymerizable reactive groups in such a large amount that the mechanical strength is sufficiently enhanced. Therefore, alternative methods have been demanded.

DISCLOSURE OF THE INVENTION

The object of the present invention is to provide a liquid crystalline compound containing no functional group such as (meth)acrylate or epoxy groups, the syntheses of which are difficult and also to provide a cholesterically aligned film which can be produced using the foregoing liquid crystalline compound without employing complicated processes such as a photo-irradiation under an inert gas atmosphere and is excellent in an ability to retain the aligned liquid crystal state after the compound is aligned and fixed in a liquid crystal phase as well as in mechanical strength.

After an extensive research and study of a polymerizable liquid crystalline compound which is easy in synthesis and has an excellent alignability in a liquid crystal phase, the inventors of the present invention found a polymerizable liquid crystalline compound having a cationically polymerizable oxetanyl group as a polymerizable reactive group. As a result, the inventors of the present invention also found that the polymerizable liquid crystalline compound was aligned in a liquid crystal state and polymerized so as to be formed into a film thereby being able to develop a novel cholesteric liquid crystal film with an excellent ability to retain the aligned liquid crystal state after being fixed in an aligned liquid crystal phase and an excellent mechanical strength.

That is, according to a first aspect of the present invention, there is provided a polymerizable liquid crystalline composition comprising (A) an oxetane compound having an optically active site represented by formula (1) below, (B) a side chain liquid crystalline polymeric substance having an oxetanyl group, and (C) a photo cation generator and/or a thermal cation generator, the weight ratio of Compound (A) to Compound (B) being within the range of 0.01:99.99 to 60:40,

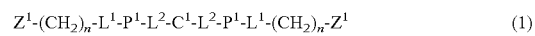

wherein $Z^1$ is a group represented by formula (2), (3) or (4) below, $L^1$ and $L^2$ are each independently a single bond, —O—, —O—CO—, or —CO—O—, $P^1$ is a group represented by formula (5) or (6) below, $C^1$ is an optically active site, and n is an integer of 0 to 8;

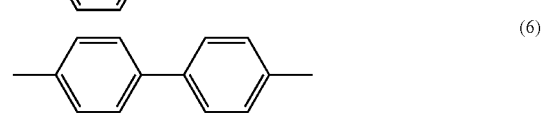

wherein X is selected from the group consisting of hydrogen, methyl, and halogen.

According to a second aspect of the present invention, there is provided the polymerizable liquid crystalline composition of the first aspect wherein $C^1$ in formula (1) is a group represented by formula (7) or (8):

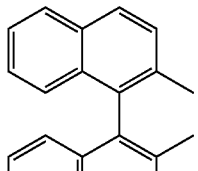
(7)

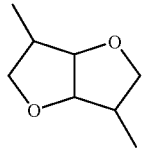
(8)

According to a third aspect of the present invention, there is provided a liquid crystal film which is obtained by forming a layer of the polymerizable liquid crystalline composition on a film with alignability so as to align and fix the molecules in a cholesteric liquid crystal state and polymerizing the layer with light and/or heat.

The present invention will be described in more details.

The polymerizable liquid crystalline composition comprises (A) an oxetane compound having an optical active portion represented by formula (1) below, (B) a side chain liquid crystalline polymeric substance having an oxetanyl group, and (C) a photo cation generator and/or a thermal cation generator:

$$Z^1\text{-}(CH_2)_n\text{-}L^1\text{-}P^1\text{-}L^2\text{-}C^1L^2\text{-}P^1\text{-}L^1\text{-}(CH_2)_n\text{-}Z^1 \quad (1)$$

wherein $Z^1$ is a group represented by any one of formulas (2), (3) and (4) below, $L^1$ and $L^2$ are each independently a single bond, —O—, —O—CO—, or —CO—O—, $P^1$ is a group represented by formula (5) or (6) below, $C^1$ is an optically active site, and n is an integer of 0 to 8;

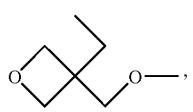
(2)

(3)

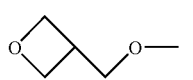
(4)

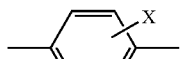
(5)

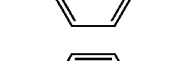
(6)

wherein X is selected from the group consisting of hydrogen, methyl, and halogen.

In the present invention, the mesogen portion represented by "-$L^1$-$P^1$-$L^2$-$C^1$-$L^2$-$P^1$-$L^1$-" of formula (1) has such a structure that two to four aromatic rings bond each other directly (single bond) or via an ether bond (—O—) or ester bond (—CO—O—) at the 1,4-position. The aromatic rings may be substituted by methyl or halogen such as fluorine or chlorine.

In formula (1), $L^1$ and $L^2$ are each independently a single bond wherein the groups at both sides of any one of L groups bond to each other directly without via the L group or a group represented by any one of —O—, —O—CO— or —CO—O— and $P^1$ is a group represented by formula (5) or (6) given above. Specific examples of a group represented by formula (5) include 1,4-phenylene, 1,4-biphenylene, methyl-substituted 1,4-phenylene, fluorine-substituted 1,4-phenylene, and chlorine-substituted 1,4-phenylene groups.

In formula (1), $C^1$ is an optical active portion and essentially has some kind of chirality. Examples of the optical active portion include those having one or more asymmetric carbons, those having asymmetric points on hetero atoms, such as chiral amines and chiral sulfoxides, and those having axial asymmetry such as cumulene and binaphthol. Specific preferred examples of $C^1$ include those represented by formulas (7) and (8):

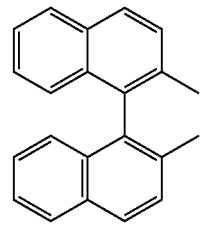
(7)

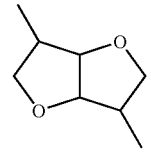
(8)

Specific examples of the portion "-$L^1$-$P^1$-$L^2$-" in formula (1) are those with a structure represented by the following formulas and the portion "-$L^2$-$P^1$-$L^1$-" are preferably those with the same structures:

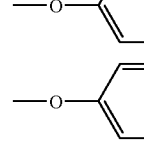

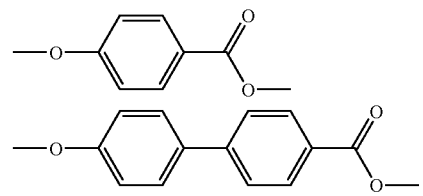

In the present invention, the spacer portion represented by "—$(CH_2)_n$—" in formula (1) indicates a single bond wherein n is 0 or is a divalent straight-chain hydrocarbon group having 1 to 8 carbon atoms. In general, a too long spacer would deteriorate the heat resistance of the resulting film after being cured. Therefore, the carbon number of the spacer portion is preferably 0 to 6.

The reactive oxetane portion "$Z^1$" is preferably a group represented by any of formula (2), (3) or (4) with the objective of easy synthesis:

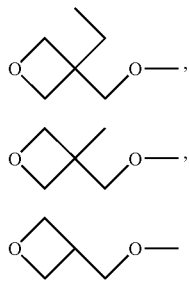

No particular limitation is imposed on the method of synthesizing the oxetane compound having an optically active portion of the present invention. Therefore, there may be used any conventional method utilized in the field of organic chemistry. For example, the oxetane compound may be synthesized by bonding oxetanyl portions to spacer portions by a method such as the Williamson ether synthesis and then bonding these bonded portions to a mesogen portion having been synthesized by an ester synthesis method using a condensation agent such as DCC (dicyclohexylcarbodiimide), by a similar ester synthesis method. Alternatively, the oxetane compound may be synthesized by bonding oxetanyl group portions to spacer portions and bonding thereto one aromatic ring having a carboxyl group by an ether synthesis and then ester-synthesized with hydroquinone.

During these syntheses, since the oxetanyl group portions at the both terminal ends have cationic polymerizability, it is necessary to select the reaction conditions with a consideration given to side reactions such as polymerization and ring-opening possibly occurring under strong acid conditions. The oxetane group is less potential to induce such side reactions, compared with epoxy group which is though a similar cationically polymerizable functional group. Furthermore, since the oxetane group may allow various compounds similar thereto, such as alcohols, phenols, and carboxylic acids to be reacted one after another, the use of protection groups may be considered if necessary. The crude liquid crystalline oxetane compound thus synthesized may be refined by recrystallization or column chromatography. Recrystallization is effective particularly for compounds of a high liquid crystallinity. Even if the compound can not be recrystallized at ordinary temperature, it may be able to be recrystallized after being cooled to a lower temperature of such as −20° C. The crude liquid crystalline oxetane compound thus obtained can be identified with an analyzing method such as $^1$H-NMR (nuclear magnetic resonance).

Particularly preferred oxetane compounds used in the present invention are particularly preferably those represented by formula (1) wherein $Z^1$ is a group represented by formula (2), $L^1$ is —O—, $L^2$ is —CO—O—, and $P^1$ is a 1,4-phenylene group or a 1,4-biphenylene group.

The polymerizable liquid crystalline composition of the present invention may contain a mixture of two or more compounds represented by formula (1) as Component (A), i.e., an oxetane compound.

Component (B) of the polymerizable liquid crystalline composition of the present invention is a side chain liquid crystalline polymeric substance having an oxetanyl group.

Particularly preferred substances for Component (B) are side chain liquid crystalline polymeric substances containing 5 to 100 percent by mol of a unit represented by formula (9) below:

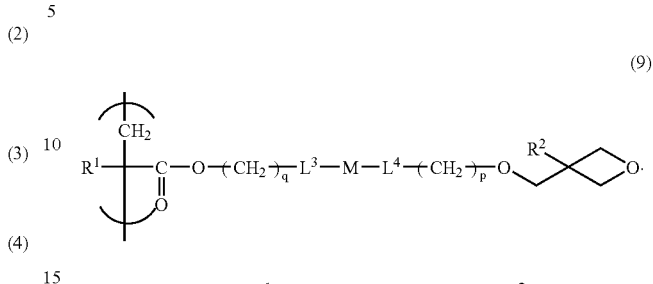

In formula (9), $R^1$ is hydrogen or methyl, $R^2$ is hydrogen, methyl, or ethyl, $L^3$ and $L^4$ are each independently a single bond, —O—, —O—CO—, or —CO—O—, M is a group represented by formula (10), (11) or (12) below, and p and q are each independently an integer from 0 to 10:

$$-P^2-L^5-P^3-L^6-P^4-\text{tm} \quad (10)$$

$$-P^2-L^5-P^4- \quad (11)$$

$$-P^4- \quad (12)$$

In formulas (10), (11), and (12), $P^2$ and $P^3$ are each independently a group selected from formulas (13) below, $P^4$ is a group selected from formulas (14) below, and $L^5$ and $L^6$ are each independently selected from a single bond, —CH=CH—, —C≡C—, —O—, —O—CO— and —CO—O—:

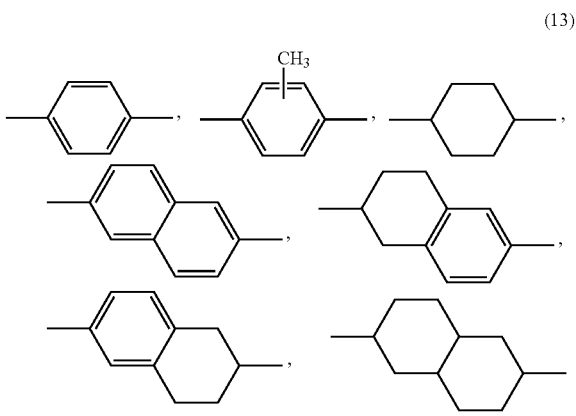

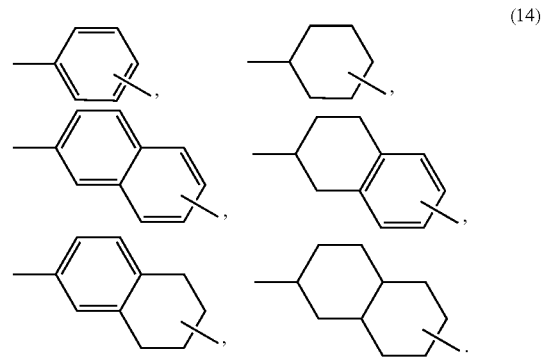

The unit of formula (9) can be derived from radical or anionic polymerization of the (meth)acrylic group portion of a (meth)acrylic compound having an oxetanyl group, represented by formula (15) below:

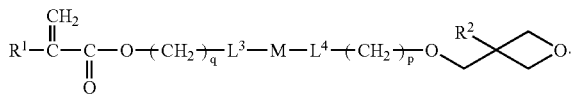

(15)

$R^1$, $R^2$, $L^3$, $L^4$, M, q, and p in formula (15) are the same as those described with respect to formula (9).

The side chain liquid crystalline polymeric substance having an oxetanyl group can be easily synthesized by homopolymerizing the (meth)acrylic group portion of a (meth)acrylic compound having an oxetanyl group of formula (15) or copolymerizing the same with another (meth) acrylic compound by way of radical or anionic polymerization. No particular limitation is imposed on the specific polymerization conditions. Therefore, the polymerization may be carried out under normal conditions.

As an example of the radical polymerization, a method may be used in which a (meth)acrylic compound is dissolved in a solvent such as dimethylformamide (DMF) and reacted at a temperature of 80 to 90° C. for several hours using 2,2'-azobisisobutylonitrile (AIBN) or benzoyl peroxide (BPO) as an initiator. Alternatively, in order to allow the liquid crystal phase to be stably exhibited there is an effective method in which living radical polymerization is conducted using an initiator such as a copper (II) bromide/2,2'-bipyridyl-based initiator or a 2,2,6,6-tetramethylpiperidinyloxy free radical (TEMPO)-based initiator so as to control the molecular weight distribution. These radical polymerizations are needed to be conducted strictly under deoxidation conditions.

As an example of the anionic polymerization, there is a method in which a (meth)acrylic compound is dissolved in a solvent such as tetrahydrofuran (THF) and reacted using a strong base such as organic lithium compounds, organic sodium compounds or Grignard reagents as an initiator. Alternatively, this polymerization can be converted to living anionic polymerization by optimizing the initiator or reaction temperature thereby controlling the molecular weight distribution. These anionic polymerizations are needed to be conducted strictly under dehydration and deoxidation conditions.

No particular limitation is imposed on types of a (meth) acrylic compounds added if necessary to be copolymerized as long as the resulting polymeric substance exhibits liquid crystallinity. However, preferred are (meth)acrylic compounds having a mesogen group because they can enhance the liquid crystallinity of the resulting polymeric substance. More specifically, particularly preferred are those as represented by the following formulas:

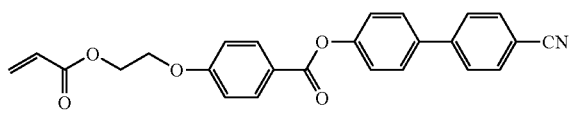

-continued

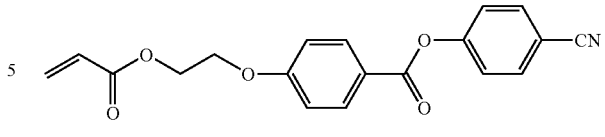

The side chain polymeric liquid crystalline substance, i.e., Component (B) of the present invention contains a unit of formula (9) in an amount of preferably 5 to 100 percent by mol and particularly preferably 10 to 100 percent by mol. The side chain polymeric liquid crystalline substance of the present invention has a weight average molecular weight of preferably 2,000 to 100,000 and particularly preferably 5,000 to 50,000.

Component (C) of the polymerizable liquid crystalline composition of the present invention is a photo cation generator and/or a thermal cation generator.

Since the polymerizable liquid crystalline composition of the present invention contains a compound having a cationically polymerizable oxetanyl group, a cation generator for polymerizing (curing) the compound is required. Preferred cation generators are compounds capable of generating cations by applying an external stimulus such as light and/or heat, such as those having a trichloromethyl or quinonediazido group and organic sulfonium salt-, iodonium salt-, or phosphonium salt-based compounds. If necessary, various sensitizers may be used in combination.

The term "photo cation generator" used herein denotes a compound which can generate cations by irradiating a light with a specific wavelength and may be any of organic sulfonium salt-, iodonium salt-, or phosphonium salt-based compounds. Counter ions of these compounds are preferably antimonate, phosphate, and borate. Specific examples include $Ar_3S^+SbF_6^-$, $Ar_3P^+BF_4^-$, and $Ar_2I^+PF_6^-$ wherein Ar indicates a phenyl or substituted phenyl group. Sulfonic acid esters, triazines, diazomethanes, β-ketosulfones, iminosulfonates, and benzoinsulfonates may also be used.

The term "thermal cation generator" used herein denotes a compound which can generate cations by being heated to a certain temperature and may be any of benzylsulfonium salts, benzylammonium salts, benzylpyridinium salts, benzylphosphonium salts, hydradinium salts, carbonic acid esters, sulfonic acid esters, amineimides, antimony pentachloride-acetyl chloride complexes, diaryliodonium salt-dibenzyloxy coppers, and halogenated boron-tertiary amine adducts.

The blend ratio of Component (A) to Component (B) in the polymerizable liquid crystalline composition of the present invention is from 0.01:99.99 to 60:40, preferably 0.1:99.9 to 50:50, and more preferably from 0.5:99.5 to 30:70 by weight ratio. The composition containing Component (A) in an amount of less than 0.01 percent is not preferable because a cholesteric orientation may not be formed. The composition containing Component (A) in an amount of more than 60 percent is not preferable because disclination may occur.

Since the amount of Component (C), i.e., the cation generator to be added in the polymerizable liquid crystalline composition varies depending on the structure of the mesogen portion or spacer portions constituting the side chain liquid crystalline polymeric substance (B) to be used, the equivalent weight of the oxetanyl group, and the conditions for aligning the composition in a liquid crystal state, it can not be determined with certainty. However, it is within the range of usually 100 ppm by mass to 20 percent by mass, preferably 1,000 ppm by mass to 10 percent by mass, more preferably 0.2 percent by mass to 7 percent by mass, and most preferably 0.5 percent by mass to 5 percent by mass. The amount of the cation generator of less than 100 ppm by mass is not preferred because polymerization may not progress due to the insufficient amount of cation to be generated. The amount of the cation generator of more than 20 percent by mass is not also preferred because the undecomposed residue of the cation generator remains in a large amount in the resulting liquid crystal film and thus the light resistance thereof would be deteriorated.

The polymerizable liquid crystalline composition having an oxetanyl group of the present invention can be easily aligned at low temperatures. Thereafter, the composition can be formed into a liquid crystal film with a fixed aligned structure and an excellent heat resistance by cationically polymerizing the oxetanyl group, resulting in crosslinking.

Therefore, a layer of the polymerizable liquid crystalline composition of the present invention is formed on a film with alignability so as to align and fix the molecules in a cholesteric state and thereafter polymerized with light and/or heat thereby obtaining a liquid crystal film with an excellent heat resistance.

Next, described is a method of producing a liquid crystal film using a polymerizable liquid crystalline composition of the present invention. Although not restricted, the film producing method preferably goes through each of the steps included in the method described below.

A liquid crystal film made from a polymerizable liquid crystalline composition of the present invention may be in any form such as one wherein a liquid crystal film is kept on an alignment substrate, i.e., (alignment substrate/(alignment layer)/liquid crystal film); one wherein a liquid crystal film is transferred to a transparent substrate film other than an alignment substrate, i.e., (transparent substrate film/liquid crystal film); or one which is a single layer of a liquid crystal film when it has a self-standing property.

Examples of the alignment substrates which can be used in the present invention are films of such as polyimide, polyamide, polyamideimide, polyphenylene sulfide, polyphenylene oxide, polyether ketone, polyetherether ketone, polyether sulfone, polysulfone, polyethyleneterephthalate, polyethylene naphthalate, polyarylate, triacetyl cellulose, epoxy resins, and phenol resins and uniaxially stretched films thereof.

Some of these films exhibit a sufficient alignability for the polymerizable liquid crystalline composition of the present invention depending on the production method of the films even though they are not subjected to an aligning treatment. However, if a film does not have alignability sufficiently or at all, the film may be stretched by an appropriate heating treatment; subjected to a rubbing treatment wherein the film is rubbed in one direction with a rayon cloth, a conductive nylon, cotton, or an acrylic resin wherein the film is rubbed after a conventional alignment layer of polyimide, polyvinyl alcohol, or a silane coupling agent is formed over the film; an oblique vapor deposition with silicon oxide; or subjected to the combination of these treatments to be provided with alignability. Alternatively, the aligning substrate may be a metal plates of aluminum, iron, or copper and any of various glass plates on which surfaces fine grooves are regularly formed.

In the case where an alignment substrate is not optically isotropic or makes the resulting liquid crystal film opaque at a wavelength region where the film is intended to be used, the liquid crystal film may be transferred from such an alignment substrate to an optically isotropic film or a substrate which is transparent at a wavelength region where the liquid crystal film is intended to be used. The transferring method may be those as disclosed in Japanese Patent Laid-Open Publication Nos. 4-57017 and 5-333313 wherein after a liquid crystal film layer on an alignment substrate is laminated via a tacky adhesive or adhesive over a transparent substrate which is different from the alignment substrate and on which the liquid crystal film layer is to be transferred, facing the another substrate and if necessary the adhesive is cured, only the liquid crystal film is transferred to the another substrate by peeling off the alignment substrate from the laminate.

Examples of the transparent substrate onto which the liquid crystal layer is transferred include triacetyl cellulose films such as Fujitack (manufactured by Fuji Photo Film Co., Ltd.) and Konicatack (manufactured by Konica Corp.); a TPX film (manufactured by Mitsui Chemical Inc.); an Arton film (manufactured by JSR); a Zeonex film (manufactured by Nippon Zeon Co., Ltd.); and a Acryprene film (manufactured by Mitsubishi Rayon Co., Ltd.). If necessary, a polarizer may be used as a transparent film. Alternatively, a quartz plate or a glass may be used. A polarizer may be used regardless of whether or not a protective layer is used.

No particular limitation is imposed on the tacky adhesive or adhesive to be used to transfer the liquid crystal film as long as it is of optical grade. Therefore, there may be used conventional acrylic-, epoxy resin-, ethylene-vinyl acetate copolymer-, rubber-, urethane-based ones, mixture types thereof, or various reactive ones of such as thermal curing type and/or photo curing type or electron radiation curing types.

The reaction conditions under which the reactive tacky adhesives or adhesives are cured vary depending on its formulation, viscosity and reaction temperature thereof. Therefore, the curing may be conducted under the conditions properly selected. For example, photo-curing type adhesives may be cured at a similar irradiation dose using a similar light source to those used for a photo cation generator described hereinafter. Electron radiation curing type adhesives may be cured at an accelerating voltage of usually 25 kV to 200 kV and preferably 50 kV to 100 kV.

The liquid crystal film may be produced by a method wherein a polymerizable liquid crystalline composition in a molten state or in the form of a solution is coated over an alignment substrate. The coated layer on the alignment layer is dried, heated for aligning it in a liquid crystal orientation, and subjected to a photo irradiation and/or a heat treatment for polymerization thereby being formed into the liquid crystal film.

No particular limitation is imposed on the solvent used for preparing a solution of a polymerizable liquid crystalline composition of the present invention as long as it can dissolve the liquid crystalline oxetane compound or other components constituting the composition and be evaporated under appropriate conditions. Preferred examples of the solvent include ketones such as acetone, methyl ethyl ketone, and isophorone; ether alcohols such as butoxy ethyl alcohol, hexyloxy ethyl alcohol, and methoxy-2-propanol; glycol ethers such as ethylene glycol dimethylether and diethylene glycol dimethyl ether; ester-based solvents such as ethyl acetate, methoxypropyl acetate and ethyl lactate; phenol-based solvents such as phenol and chlorophenol; amide-based solvents such as N,N-dimethylformamide, N,N-dimethylacetoamide, and N-methylpyrrolidone; halogenated hydrocarbon-based solvents such as chloroform, tetrachloroethane, and dichlorobenzene; and mixtures thereof. Surfactants, defoaming agents, or leveling agents may be added to the solution so as to form a uniform film layer on an alignment substrate. Furthermore, for the purpose of coloring, dichroric dyes, dyes, or pigments may be added to an extent that the exhibition of liquid crystallinity is not bothered.

No particular limitation is imposed on the method of coating a polymerizable liquid crystalline composition of the present invention as long as it can ensure the uniformity of the film layer. Therefore, there may be used any conventional method such as roll coating, die coating, dip coating, curtain coating, or spin coating methods. The coating may be followed by a solvent-removing process, i.e., drying using a heater or a hot air blowing.

Thereafter, if necessary, a heat treatment is conducted so as to form the coating in a liquid crystal aligned state. In this heat treatment, the polymerizable liquid crystalline composition used is heated to the range of temperatures at which the composition exhibits a liquid crystal phase, so as to align the composition in the liquid crystal state by its self-alignability. Since the conditions for the heat treatment vary in optimum conditions and limits depending on the liquid crystal phase behavior temperature (transition temperature) of the polymerizable liquid crystalline composition to be used, it can not be determined with certainty. However, the heat treatment is conducted at a temperature within the range of usually 10 to 200° C., preferably 20 to 150° C. Temperatures below 10° C. are not preferred because there is a possibility that the composition may not be aligned in a liquid crystal state sufficiently, while those in excess of 200° C. are not also preferred because the oxetane group and the substrate may be adversely affected. The heat treatment is conducted for usually 3 seconds to 30 minutes, preferably 10 seconds to 10 minutes. The heat treatment for shorter than 3 seconds is not preferred, because there is a possibility that the composition may not be aligned in a liquid crystal phase completely. Whereas, the heat treatment for longer than 30 minutes is not also preferred, because the productivity is extremely deteriorated. After the liquid crystalline composition is completely aligned in a liquid crystal state by the heat treatment or the like, the composition on the alignment substrate is polymerized (cured) by a photo irradiation and/or a heat treatment. In the present invention, the polymerization (curing) process is conducted so as to modify the polymerizable liquid crystalline composition to be a harder film layer by fixing the completely aligned liquid crystal state by a polymerization reaction.

No particular limitation is imposed on the thickness of the liquid crystal film fixed in a cholesterically aligned state produced by any of the above-described methods. The thickness is generally from 0.3 to 20 μm, preferably 0.5 to 10 μm, and more preferably 0.7 to 3 μm in view of mass-productivity and manufacturing process.

Since the liquid crystal film of the present invention has a cholesteric liquid crystallinity and exhibits beautiful color when the selective reflection wavelength region is in a visible light region, it is not only applicable to the field of optics and photoelectronics but also useful as ornamental articles and accessories. Furthermore, the liquid crystal film can exhibit excellent properties when it is used as any of pigments, color polarizers, luminance improving films, and forgery preventing films.

BEST MODE FOR CARRYING OUT THE INVENTION

The present invention will be further described in the following examples, but should not be construed as being limited thereto.

The measurement of the transmission spectrum used in the examples was conducted using V-570 manufactured by JASCO Corporation.

SYNTHESIS EXAMPLE 1

In accordance with Scheme 1 below, an oxetanyl compound (1) having an optically active site was synthesized using 3-ethyl-3-hydroxymethyloxetane (OXT-101, manufactured by Toagosei Co., Ltd.) and isosorbide (manufactured by Tokyo Kasei Kogyo Co., Ltd.) as the starting materials. The resulting compound was refined in a hexane/ethyl acetate solvent with a silica gel chromatography.

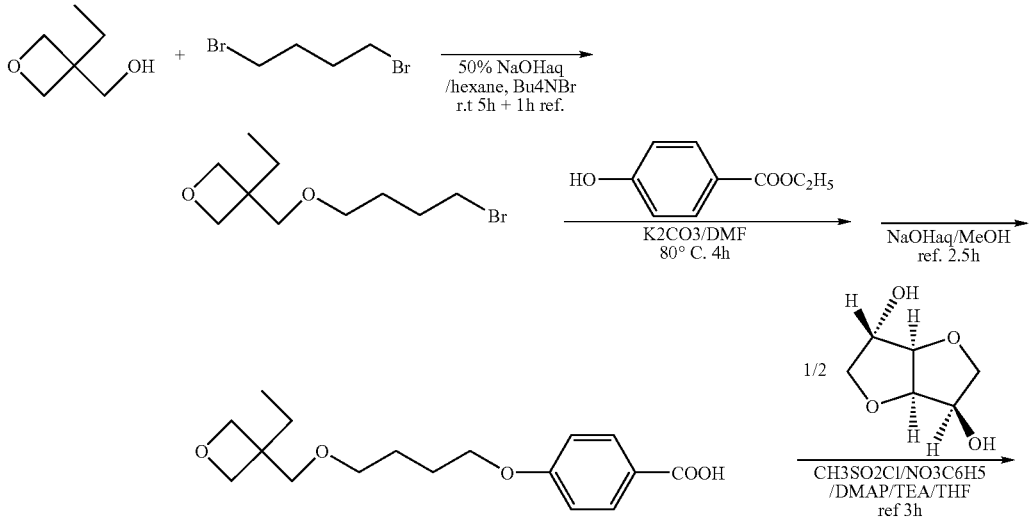

-continued

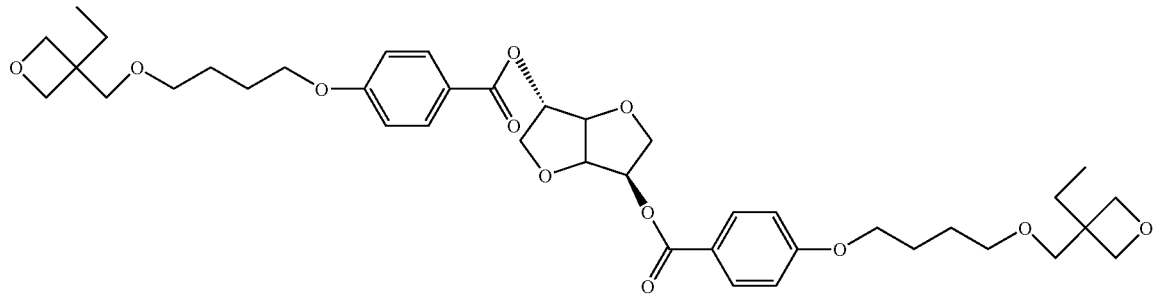

Oxetanyl Compound (1)

SYNTHESIS EXAMPLE 2

In accordance with Scheme 2 below, an oxetanyl compound (2) having an optically active site was synthesized using 3-ethyl-3-hydroxymethyloxetane (OXT-101, manufactured by Toagosei Co., Ltd.) and S-(−)-1,1'-bi-2-naphthol (manufactured by KANTO KAGAKU) as the starting materials. The resulting compound was refined in a hexane/ethyl acetate solvent with a silica gel chromatography.

Scheme 2

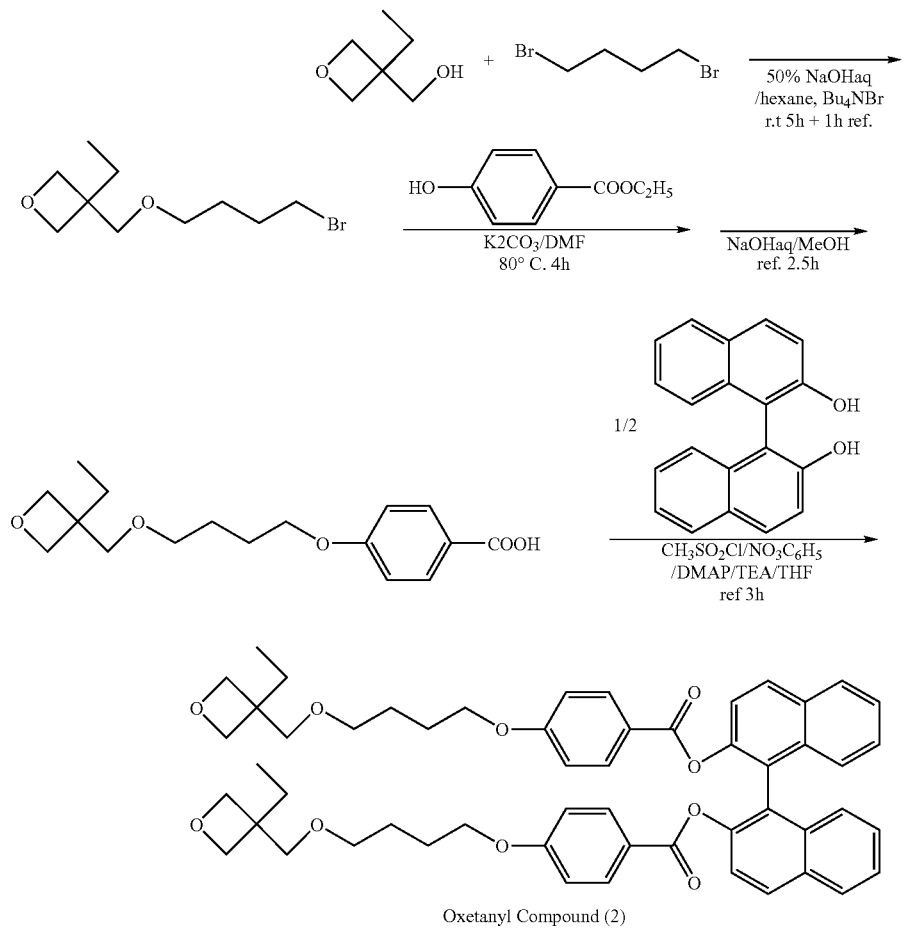

Oxetanyl Compound (2)

SYNTHESIS EXAMPLE 3

In accordance with Scheme 3 below, an oxetanyl compound (3) having an optically active site was synthesized using 3-ethyl-3-hydroxymethyloxetane (OXT-101, manufactured by Toagosei Co., Ltd.) and isosorbide (manufactured by Tokyo Kasei Kogyo Co., Ltd.) as the starting materials. The resulting compound was refined in a hexane/ethyl acetate solvent with a silica gel chromatography.

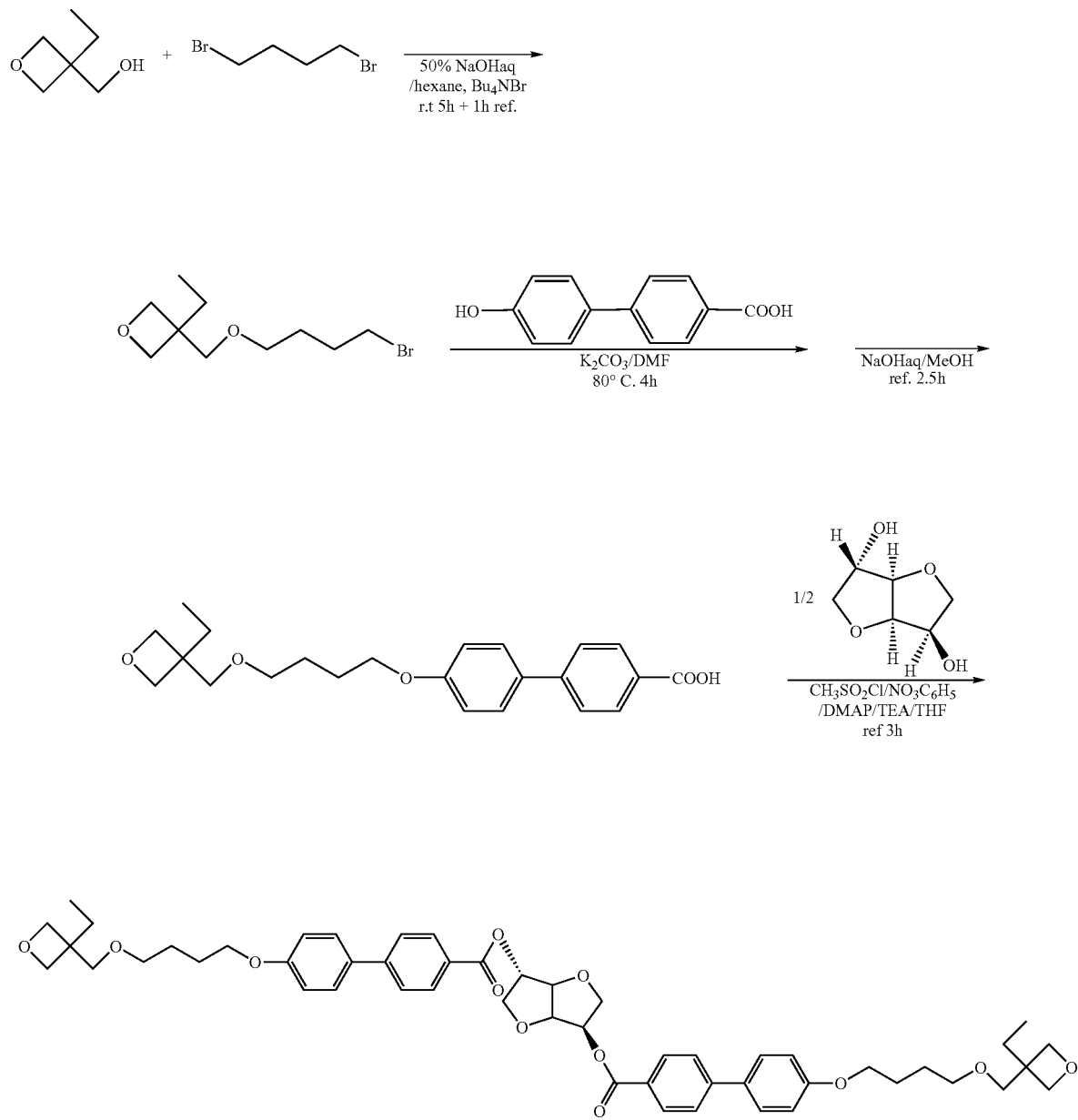

Oxetanyl Compound (3)

SYNTHESIS EXAMPLE 4
In accordance with Scheme 4 below, an acrylic compound (4) having an oxetanyl group was synthesized. The resulting compound was refined in a hexane/ethyl acetate solvent with a silica gel chromatography.
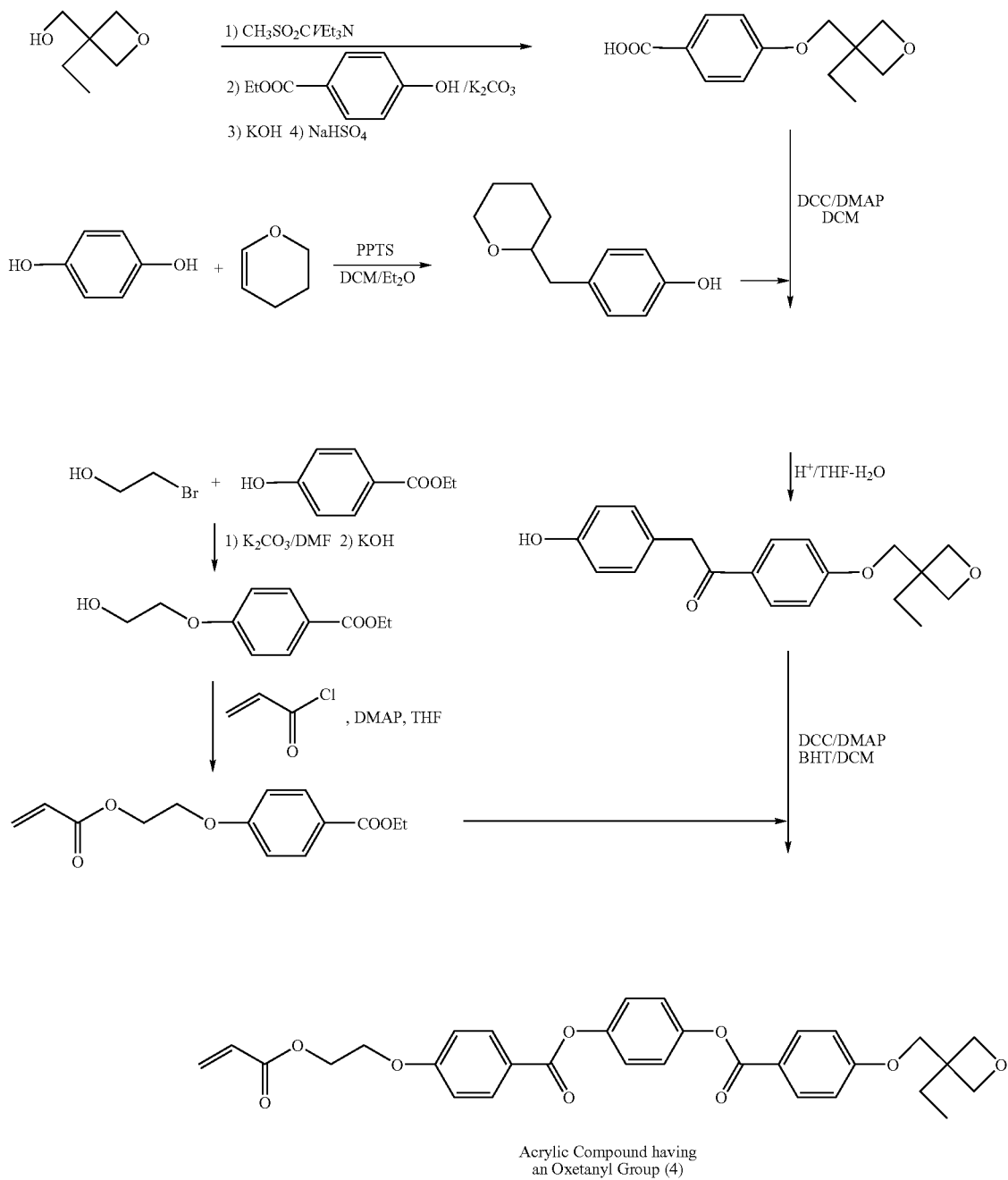
Acrylic Compound having an Oxetanyl Group (4)

SYNTHESIS EXAMPLE 5
In accordance with Scheme 5 below, an acrylic compound (5) having an oxetanyl group was synthesized. The resulting compound was refined in a hexane/ethyl acetate solvent with a silica gel chromatography.
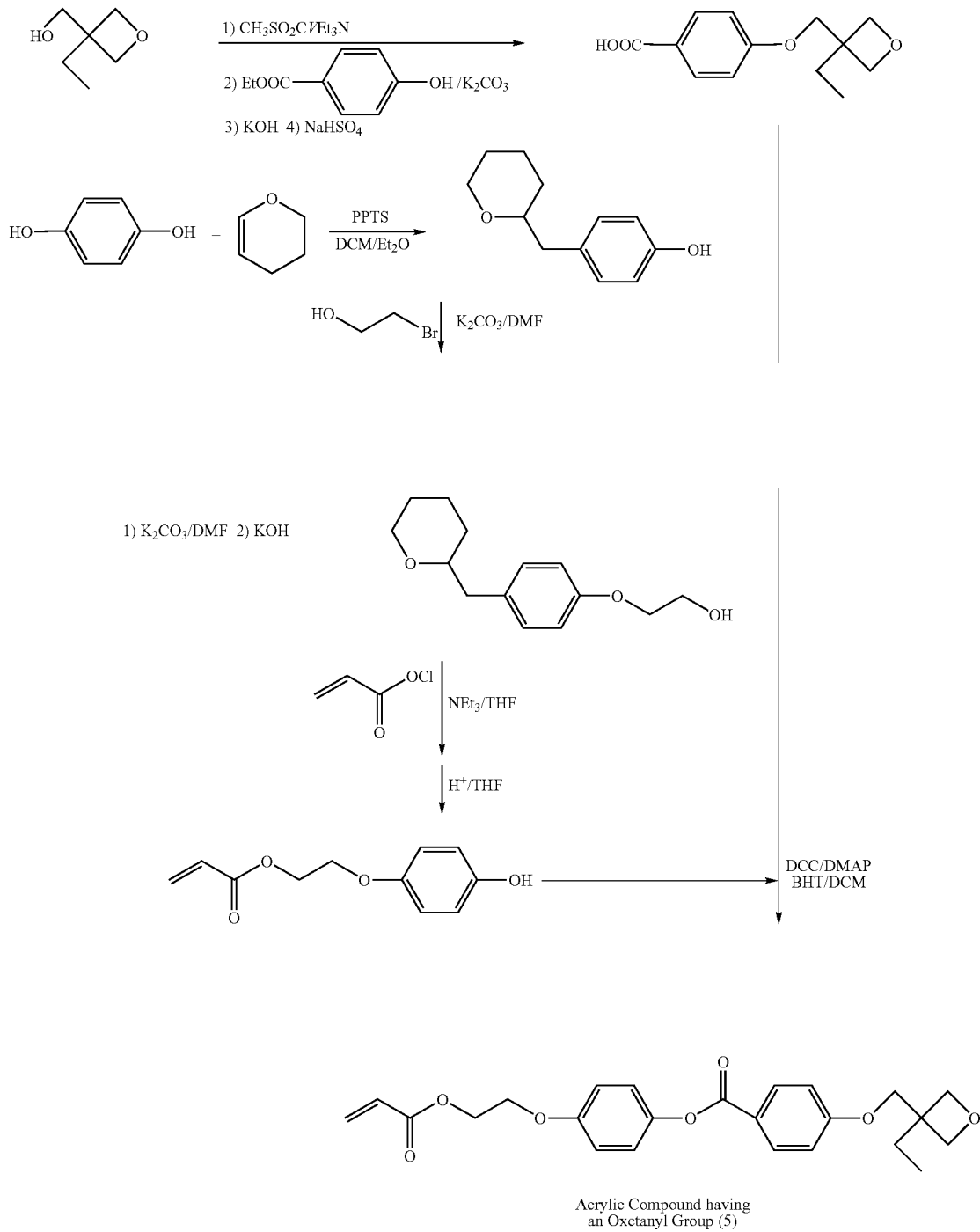

SYNTHESIS EXAMPLE 6

In accordance with Scheme 6 below, an acrylic compound (6) having no oxetanyl group was synthesized. The resulting compound was refined in a hexane/ethyl acetate solvent with a silica gel chromatography.

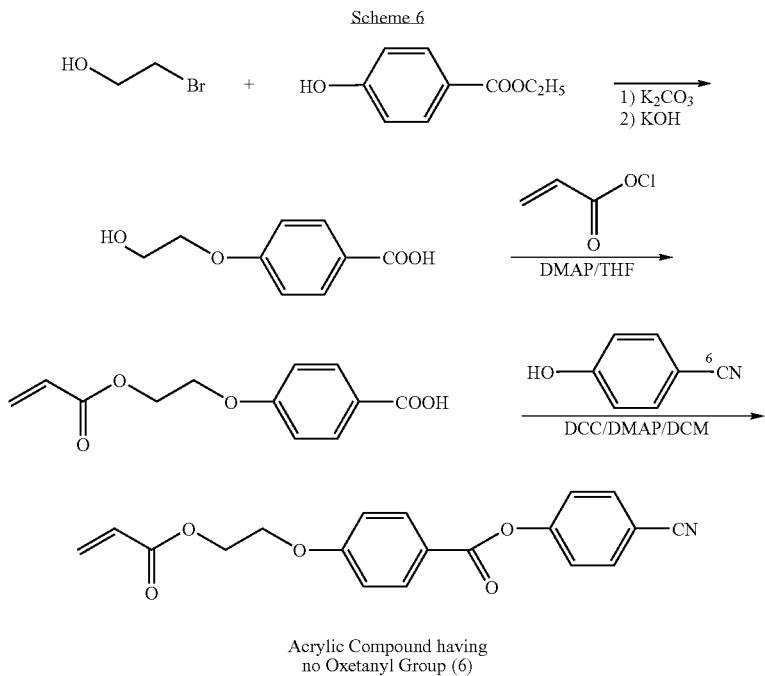

Acrylic Compound having no Oxetanyl Group (6)

SYNTHESIS EXAMPLE 7

In accordance with Scheme 7 below, an acrylic compound (7) having no oxetanyl group was synthesized. The resulting compound was refined in a hexane/ethyl acetate solvent with a silica gel chromatography.

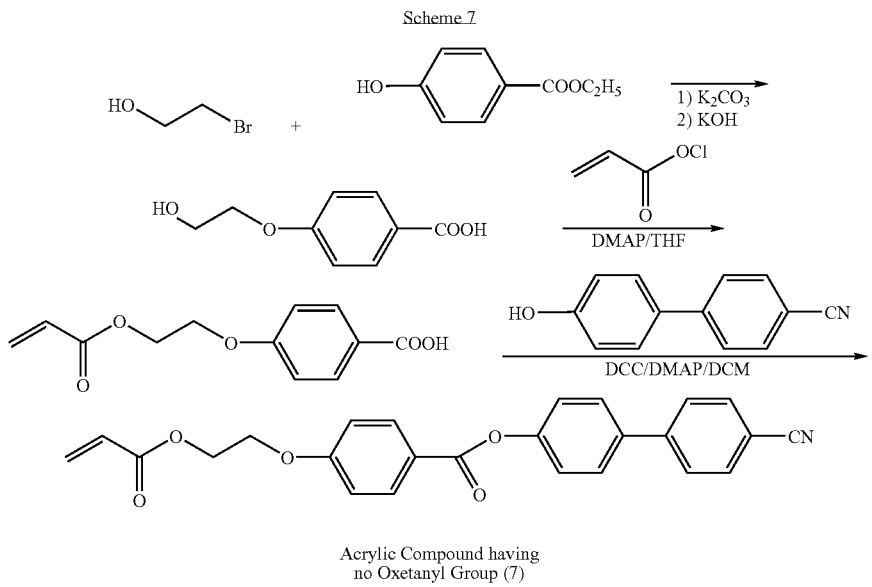

Acrylic Compound having no Oxetanyl Group (7)

SYNTHESIS EXAMPLE 8

20 percent by weight of the acrylic compound (4) synthesized in Synthesis Example 4 and 80 percent by weight of the acrylic compound (6) synthesized in Synthesis Example 6 were mixed and radical-polymerized using 2,2'-azobisisobutyronitrile as an initiator and DMF as a solvent under a nitrogen atmosphere at a temperature of 90° C. for 6 hours. The resulting product was reprecipitated with methanol for refining thereby synthesizing a side chain liquid crystalline polyacrylate (8) having an oxetanyl group.

EXAMPLE 1

0.06 g of the oxetanyl compound (1) having an optically active site synthesized in Synthesis Example 1 and 0.94 g of the side chain liquid crystalline polyacrylate (8) synthesized in Synthesis Example 8 were dissolved in cyclohexane. To the solution in a dark place was added 0.1 g of a propylene carbonate solution with 50% triarylsulfoniumhexafluoroantimonate (a reagent manufactured by Aldrich Co.). The mixed solution was filtered to remove the insolubles with a polytetrafluoroethylene filter with a pore size of 0.45 μm

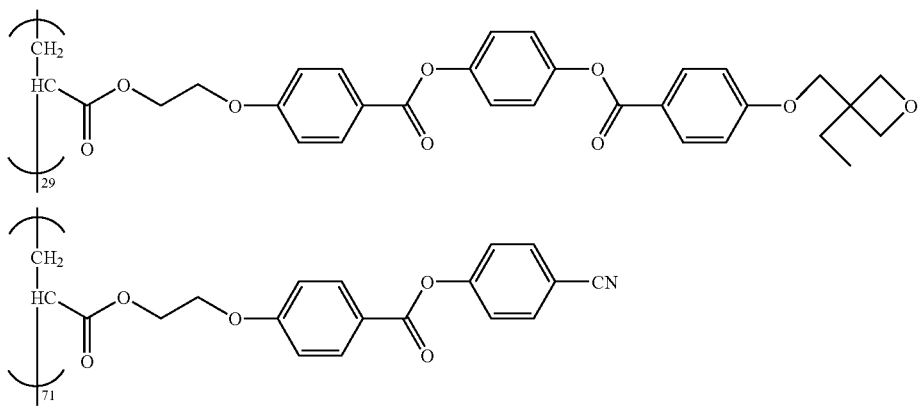

Side Chain Liquid Crystalline Polyacrylate (8)

SYNTHESIS EXAMPLE 9

25 percent by weight of the acrylic compound (5) synthesized in Synthesis Example 5 and 75 percent by weight of the acrylic compound (7) synthesized in Synthesis Example 7 were mixed and radical-polymerized using 2,2'-azobisisobutyronitrile as an initiator and DMF as a solvent under a nitrogen atmosphere at a temperature of 90° C. for 6 hours. The resulting product was reprecipitated with methanol for refining thereby synthesizing a side chain liquid crystalline polyacrylate (9) having an oxetanyl group.

thereby preparing a solution of a liquid crystalline composition. The resulting solution was spin-coated over a 50 μm thickness polyethylene naphthalate film (Teonex Q-51 manufactured by TEIJIN Limited) whose surface had been subjected to a rubbing treatment with a rayon cloth and then dried on a hot plate kept at 60° C. The resulting liquid crystal composition layer on the polyethylene naphthalate film was heated at a temperature of 150° C. for 5 minutes and quenched to room temperature thereby obtaining a liquid crystal composition layer.

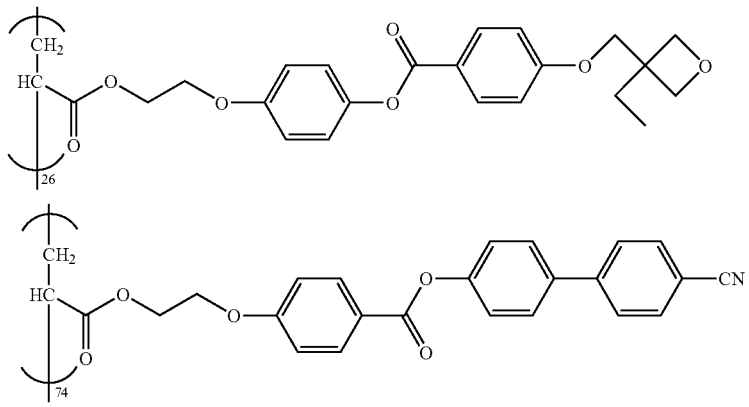

Side Chain Liquid Crystalline Polyacrylate (9)

Since the polyethylene naphthalate film used as a substrate was large in birefringence and thus not preferable as an optical film, the film was transferred via an ultraviolet curing type adhesive (UV-1394 manufactured by Toagosei Co., Ltd.) onto a triacetylcellulose (TAC) film thereby obtaining an optical film. More specifically, UV-1394 with a thickness of 5 μm was coated over the cured liquid crystal composition layer on the polyethylene naphthalate film and laminated with a TAC film. After the laminate was subjected to an irradiation of ultraviolet light of 400 mJ/cm² from the TAC film side so as to cure the adhesive, the polyethylene naphthalate film was released.

As a result of observation of the resulting optical film through a polarizing microscope, it was confirmed that the film exhibited a monodomain uniform cholesteric liquid crystal state having no disclination. When the film was viewed from the front, it had a selective reflection light peculiar to the cholesteric state. When the transmittance spectrum of the optical film was evaluated through the spectroscope, a region wherein the transmitted light peculiar to the selective reflection was decreased was observed around 610 nm which is in the infrared region.

EXAMPLE 2

0.05 g of the oxetanyl compound (2) having an optically active portion synthesized in Synthesis Example 2 and 0.95 g of the side chain liquid crystalline polyacrylate (9) synthesized in Synthesis Example 9 were dissolved in triethylene glycol dimethyl ether. To the solution in a dark place was added 0.05 g of a propylene carbonate solution with 50% triarylsulfoniumhexafluoroantimonate (a reagent manufactured by Aldrich Co.). The mixed solution was filtered to remove the insolubles with a polytetrafluoroethylene filter with a pore size of 0.45 μm thereby preparing a solution of a liquid crystalline composition. The resulting solution was spin-coated over a 50 μm thickness polyethylene terephthalate film (T-60 manufactured by Toray Industries, Inc.) whose surface had been subjected to a rubbing treatment with a rayon cloth and then dried on a hot plate kept at 60° C. The resulting liquid crystal composition layer on the polyethylene terephthalate film was heated at a temperature of 150° C. for 5 minutes and quenched to room temperature thereby obtaining a liquid crystal composition layer.

Since the polyethylene terephthalate film used as a substrate was large in birefringence and thus not preferable as an optical film, the film was transferred via an ultraviolet curing type adhesive (UV-3400 manufactured by Toagosei Co., Ltd.) onto a TAC film thereby obtaining an optical film. More specifically, UV-3400 with a thickness of 5 μm was coated over the cured liquid crystal composition layer on the polyethylene terephthalate film and laminated with a TAC film. After the laminate was subjected to an irradiation of ultraviolet light of 400 mJ/cm² from the TAC film side so as to cure the adhesive, the polyethylene terephthalate film was released.

As a result of observation of the resulting optical film through a polarizing microscope, it was confirmed that the film exhibited a monodomain uniform cholesteric liquid crystal state having no disclination. When the film tilted obliquely was viewed, it had a selective reflection light peculiar to the cholesteric state. When the transmission spectrum of the optical film was evaluated through the spectroscope, a region wherein the transmitted light peculiar to the selective reflection was decreased was observed around 780 nm.

EXAMPLE 3

0.08 g of the oxetanyl compound (3) having an optically active site synthesized in Synthesis Example 3 and 0.92 g of the side chain liquid crystalline polyacrylate (9) synthesized in Synthesis Example 9 were dissolved in N-methyl-2-pyrrolidone. To the solution in a dark place was added 0.1 g of a photo curing initiator (CYRACURE UVI-6992 manufactured by DOW Chemical Company) and 0.01 g of dibutoxyanthracene manufactured by KAWASAKI KASEI CHEMICALS LTD. The mixed solution was filtered to remove the insolubles with a polytetrafluoroethylene filter with a pore size of 0.45 μm thereby preparing a solution of a liquid crystalline composition. The resulting solution was spin-coated over a 75 μm thickness polyethylene naphthalate film (Teonex Q-51 manufactured by TEIJIN Limited) whose surface had been subjected to a rubbing treatment with a rayon cloth and then dried on a hot plate kept at 60° C. The resulting liquid crystal composition layer on the polyethylene naphthalate film was heated at a temperature of 150° C. for 5 minutes and quenched to room temperature thereby obtaining a liquid crystal composition layer.

Since the polyethylene naphthalate film used as a substrate was large in birefringence and thus not preferable as an optical film, the film was transferred via an ultraviolet curing type adhesive (UV-1394 manufactured by Toagosei Co., Ltd.) onto a TAC film thereby obtaining an optical film. More specifically, UV-1394 with a thickness of 5 μm was coated over the cured liquid crystal composition layer on the polyethylene naphthalate film and laminated with a TAC film. After the laminate was subjected to an irradiation of ultraviolet light of 400 mJ/cm² from the TAC film side so as to cure the adhesive, the polyethylene naphthalate film was released.

As a result of observation of the resulting optical film through a polarizing microscope, it was confirmed that the film exhibited a monodomain uniform cholesteric liquid crystal state having no disclination. When the film was viewed from the front, it had a selective reflection light peculiar to the cholesteric state. When the transmittance spectrum of the optical film was evaluated through the spectroscope, a region wherein the transmitted light peculiar to the selective reflection was decreased was observed around 560 nm.

We claim:

1. A polymerizable liquid crystalline composition comprising (A) an oxetane compound having an optically active portion represented by formula (1) below, (B) a side chain liquid crystalline polymeric substance having an oxetanyl group, and (C) a photo cation generator and/or a thermal cation generator, the weight ratio of Compound (A) to Compound (B) being within the range of 0.01:99.99 to 60:40:

$$Z^1\text{-}(CH_2)_n\text{-}L^1\text{-}P^1\text{-}L^2\text{-}C^1\text{-}L^2\text{-}P^1\text{-}L^1\text{-}(CH_2)_n\text{-}Z^1 \qquad (1)$$

wherein $Z^1$ is a group represented by formula (2), (3) or (4) below, $L^1$ and $L^2$ are each independently a single bond, —O—, —O—CO—, or —CO—O—, $P^1$ is a group represented by formula (5) or (6) below, $C^1$ is an optically active site, and n is an integer of 0 to 8;

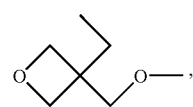

(2)

(3)

-continued

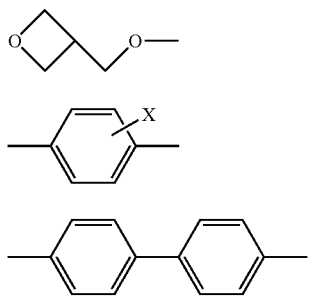
(4)

(5)

(6)

wherein X is selected from the group consisting of hydrogen, methyl, and halogen.

2. The polymerizable liquid crystalline composition according to claim 1 wherein $C^1$ in formula (1) is a group represented by formula (7) or (8):

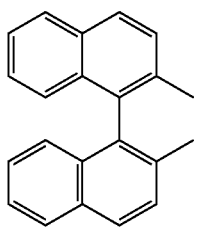
(7)

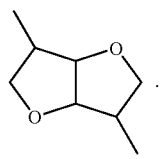
(8)

3. The polymerizable liquid crystalline composition according to claim 1 wherein in formula (1) $Z^1$ is a group represented by formula (2), $L^1$ is —O—, $L^2$ is —CO—O—, $P^1$ is a 1,4-phenylene group or a 1,4-biphenylene group, and $C^1$ is a group represented by formula (7) or (8).

4. The polymerizable liquid crystalline composition according to claim 1 wherein the weight ratio of Compound (A) to Compound (B) is within the range of 0.1:99.9 to 50:50.

5. The polymerizable liquid crystalline composition according to claim 1 wherein the weight ratio of Compound (A) to Compound (B) is within the range of 0.5:99.5 to 30:70.

6. A liquid crystal film which is obtained by forming a layer of the polymerizable liquid crystalline composition defined in claim 1 or 2 on a film with alignability so as to align and fix the molecules in a cholesteric aligned liquid crystal state and polymerizing the layer with light and/or heat.

* * * * *